United States Patent [19]

Wackenreuther et al.

[11] 4,097,076
[45] Jun. 27, 1978

[54] FITTING PIECE FOR RIGID OR FLEXIBLE TUBES

[75] Inventors: Helmut Wackenreuther; Alexander Svec, both of Krems, Austria

[73] Assignee: Oesterreichische Salen-Kunststoffwerk Gesellschaft m.b.H., Vienna, Austria

[21] Appl. No.: 659,359

[22] Filed: Feb. 19, 1976

[30] Foreign Application Priority Data

Feb. 25, 1975  Austria .................................. 1444/75

[51] Int. Cl.² ............................................ F16L 19/06
[52] U.S. Cl. ............................... 285/340; 277/207 A; 285/39; 285/111; 285/308; 285/379; 285/423
[58] Field of Search .................. 285/39, 110, 111, 230, 285/231, 308, 340, 345, 351, 379, 423; 277/207 A

[56] References Cited

U.S. PATENT DOCUMENTS

| | | | |
|---|---|---|---|
| 2,809,853 | 10/1957 | Nathan | 285/374 X |
| 3,260,540 | 7/1966 | Houot | 285/110 |
| 3,315,971 | 4/1967 | Sakurada | 285/110 X |
| 3,573,871 | 4/1971 | Warner | 285/110 X |
| 3,575,430 | 4/1971 | Alpine | 285/110 X |
| 3,633,944 | 1/1972 | Hamburg | 285/111 X |
| 3,645,547 | 2/1972 | Glover | 285/110 X |
| 3,791,678 | 2/1974 | De Putter | 285/110 |
| 3,857,589 | 12/1974 | Oostenbrink | 285/110 |
| 3,901,538 | 8/1975 | Blakely | 285/308 X |

FOREIGN PATENT DOCUMENTS

| | | | |
|---|---|---|---|
| 1,625,928 | 4/1971 | Germany | 285/340 |
| 2,014,329 | 10/1971 | Germany | 285/110 |
| 1,323,057 | 7/1973 | United Kingdom | 285/110 |
| 1,260,290 | 1/1972 | United Kingdom | 285/110 |

Primary Examiner—Werner H. Schroeder
Assistant Examiner—Moshe I. Cohen
Attorney, Agent, or Firm—Cushman, Darby & Cushman

[57] ABSTRACT

A fitting piece for connecting rigid or flexible tubes which are made particularly from plastic, the fitting piece having an opening to receive therein the tube and being provided with at least one inwards protruding annular rib having edges, preferably sharp edges, the cross-section of said rib being formed in such a manner that a straight line interconnecting the center point of the basis to the peak of the cross-section is inclined to the axis of the tube-receiving opening by an acute angle with its vertex pointing to the interior of said opening, said fitting piece being characterized in that at least the annular rib and preferably the whole of the fitting piece is made from an elastically deformable plastic material whose coefficient of elasticity amounts to at least 20,000 kgf per cm², that the width of the basis of said rib is smaller than the radial extension of the rib, that the rib is divided by radial incisions into segments interconnected to one another, and that there is provided at least one sealing element.

9 Claims, 8 Drawing Figures

FITTING PIECE FOR RIGID OR FLEXIBLE TUBES

Fitting pieces which are used to connect rigid or flexible tubes of plastics have a bore into which the tube is inserted, said bore being internally formed with annular ribs. Known fittings of this kind are made from metal and have a plurality of endless ribs having annular form and being provided with an inwards facing saw tooth profile. Thus the tube may be inserted into the bore whilst these ribs present a resistance against extraction of the tube.

The internal diameter of said annular ribs must be slightly smaller than the external diameter of the tube to be inserted thereinto. In this way, a tight sealing and, on the other hand, the necessary resistance against extraction is secured. Consequently, inserting a tube into such a conventional fitting needs considerable force and necessitates that the internal diameter of the ribs be not too inferior in comparison with the tube's nominal diameter. This, in turn, means a limitation for the holding force of the ribs. With rigid or flexible tubes of plastics, the allowable variation amounts to 2 percent of the nominal diameter. As a result, inserting a tube dimensioned within the upper range of tolerance needs an extremely high force, and, on the other hand, a tube with a lower actual size is too easy to extract.

The scope of the annular ribs provided in the conventional fitting is not only holding the tube inserted thereinto but also sealing the connection. The edges of the ribs exert permanently a pressure against the wall. A result of this pressure is the retaining force, but in the course of time the plastic material of the tube begins to flow under said pressure. Thus the sealing effect diminishes with the duration of use. Known fittings of the kind are made from non-ferrous metals. At least the ribs in the tube-receiving opening must be machined. Hence these fittings are expensive. Socketed tubes are known which receive in the socket the tapered end of a tube and which are provided within the socket with sealing elements having inwardly projecting annular ribs made from special sealing material. Such sealing elements cannot generate adequate retaining forces.

The present invention relates to a fitting piece for connecting rigid or flexible tubes, particularly plastic tubes, having an opening to receive therein the tube and being provided with at least one inwardly protruding annular rib having edges, preferably sharp edges, the cross-section of said rib being formed in such a manner that a straight line interconnecting the center point of the base to the peak of the cross-section is inclined to the axis of the tube-receiving opening by an acute angle with its vertex pointing to the interior of said opening.

The scope of the invention is to overcome the disadvantages of the known fittings. The invention is essentially characterized in that at least the annular rib and preferably the whole of the fitting piece is made from an elastically deformable plastic material whose coefficient of elasticity amounts to at least 20,000 kgf per cm$^2$, that the width of the base of said rib is smaller than the radial extension of the rib, that the rib is divided by radial incisions into segments interconnected to one another, and that there is provided at least one sealing element. Since at least the rib is made from an elastically deformable plastic material and since the width of the base of the rib is smaller than the radial extension of the same, the rib is deflectable, and inserting a tube is facilitated, and there will be a better certainty that the plumber fulfills indeed regularly his work. The rib clings tightly to the outer wall of the tube, and is directed towards the inner end of the receiving opening. A stress acting on the rib when an extraction force is applied to the inserted tube, causes the rib to reduce its inner diameter and to press itself firmly and tightly against the tube wall, so strengthening the retaining force. In this case, the fluid pressure within the tube acts in the sense of expelling the tube from the fitting.

The greater the extracting stress, the stronger the pressure between the rib and the tube wall. Thus the retaining force increases in dependence of the increasing stress. The radial incisions dividing the rib into separated segments lower the circumferential strain arising in the rib whereby deformation of the rib is facilitated and insertion of a tube into the fitting piece becomes easier. The rib engages better the outer wall of the tube. Tightness is insured by said separate sealing element. The plastic material of the sealing element or rib being defined by its coefficient of elasticity, namely 20,000 kgf per cm$^2$, the edge of the rib shall be hard enough to insure a suitable contact on the outer wall of the tube, and to insure at the same time the necessary resilience of the rib. A preferred embodiment of the invention provides a material characterized by a coefficient of elasticity ranging between 20,000 and 40,000 kgf per cm$^2$, particularly from 33,000 to 36,000 kgf per cm$^2$, and preferably a thermoplastic material as polyacetal resin.

According to the invention it is useful when the radial extension of the cross-section of the annular rib equals 1½ to 3 times, preferably 2 times the average width of the cross-section. Such a proportion is favorable for the elastic deformation during inserting a tube as well as for fastening the tube should an extraction force be applied thereon. This advantage is best achieved if the center line bisecting the angle formed between two lines representing the profile borders of the rib in its region nearer to the axis of the opening is inclined with relation to said axis by an angle $\beta$ ranging from 60° to 80°, preferably about 70°.

In a preferred embodiment of the invention an axially extending annular clearance is provided in the base of the rib on the side facing towards the entrance end of the opening, the width of said clearance ranging from 0 to 0.3 mm, preferably about 0.1 mm. By inserting a tube into the tube-receiving opening the annular rib is strained to deformation towards the inner end and the clearance becomes wider. The cross-section of the base of the rib which remains effective when inserting forces are applied is restricted to that portion which is not cut in by said annular groove. This further facilitates the deformation of the rib and the insertion of the tube. An extracting force acting on the annular rib causes the base to abut against the inner surface of said annular groove whereby the clearance closes and the effective cross-section of the base is enlarged to the total of its width. As a result, the retaining force of the rib is essentially increased. According to the invention, the annular groove should extend at least through the half width of the base of the rib.

The whole of the fitting piece may be composed, as known per se, of several separated annular elements pressed or injection-moulded from a thermoplastic material and connected to each other e.g. by friction welding. Or, connecting may be achieved by a sticking process or by pressing the heated surfaces against each other. With an intricate configuration, this way of manufacturing is to be preferred in view of the possibility to remove the parts from the mould. As to so composed fitting pieces, the invention provides that one of the elements to be welded is provided with an annular extension oriented axially and engaging the annular groove of said annular rib formed on the adjacent element, and that the width of said annular clearance corresponds to the width of the groove minus the width of said extension. So it is possible to provide a relatively large annular groove which is advantageous with regard to the moulding techniques. A round-off radius may be foreseen to avoid the notch effect. The engaging connection between said extension and said groove allows to make the clearance as narrow as desired even till a zero dimension.

Preferably the cross-section of the rib may have a configuration like a girder of throughout equal bending stress, so that the bending stress is equally distributed over the whole length, the greatest elastic deformability being achievable with the lowest stress.

According to the invention the sealing element may be a separate sealing ring. To receive this ring, the diameter of the opening behind the annular rib exceeds the internal diameter $a$ of said rib. According to another modification it is provided that the sealing element is an annular sealing lip made from the same material as the fitting piece, that it is positioned preferably at the side of the rib opposed to the entrance end of the tube-receiving opening, and that it extends to the interior of said opening. A sealing lip of this kind surrounds an inserted tube closely in a tensioned state. Since an internal fluid pressure strains said lip towards the axis of the bore, the surrounding force and sealing effect increase in accordance with an increasing fluid pressure within the tube. In order to insure such an elastical deformation it may be provided that the length of the cross-section of said annular lip equals 3 to 10 times, preferably about 4 to 5 times the median width thereof, and whilst the center line bisecting the angle formed between the two lines representing the profile borders of the lip is inclined with relation to the axis of the tube-receiving opening by an angle $\theta$ ranging from 10° to 70°, preferably about 30°. In this connection the internal diameter $b$ of the annular sealing lip while being in a loose state should be smaller than the average internal diameter $a$ of the annular rib while being in a loose state, the diameter difference being 0.5 to 2.5 percent, preferably about 1.5 percent. Moreover, the end surface of the annular lip in its loose state may be cylindrical and coaxial with the opening. The scope of the proposed configuration is to avoid any incision or other damage to the outer surface of the tube. So the sealing effect remains unimpaired even if the tube is shifted in axial direction.

In a preferred embodiment of the invention the diameter of the tube-receiving opening is set off before and behind the annular rib, preferably at the entrance end and the inner end, the set-off diameter $c$ corresponding to the diameter of the tube plus a slight backlash. Thus the tube is guided on both sides of the annular rib and the sealing element. Bending stresses have no influence on the rib or the sealing element. While the annular rib in general is integrally connected with the fitting piece, said rib may be rotatable with relation to that fitting element which comprises the sealing element. This modification is to be preferred with a fitting piece provided with a screw thread for connecting it to an armature. Mounting or dismounting such a fitting piece into or out of the armature, respectively, does not cause the annular rib to rotate with relation to an inserted tube so that the tube is protected against damages caused by the sharp edges of the rib. For example, the annular rib may be formed of a ring rotatably inserted in an annular groove, said ring having no axial movability or only a limited axial movability. Another possibility would be a fitting piece which consists of two elements releasably connected to each other, one of them being provided with the annular rib whilst the other surrounds the sealing element wherein the two elements releasably connected are rotatable relative to each other but firmly coupled together against axial traction. With this modification too, the element that supports the rib must not be rotated when the other element is screwed into or out of the armature.

In the accompanying drawings the invention is illustrated by way of examples.

FIG. 1 shows one embodiment of the invention,

FIG. 2 representing on an enlarged scale a part of FIG. 1.

Figure 1:
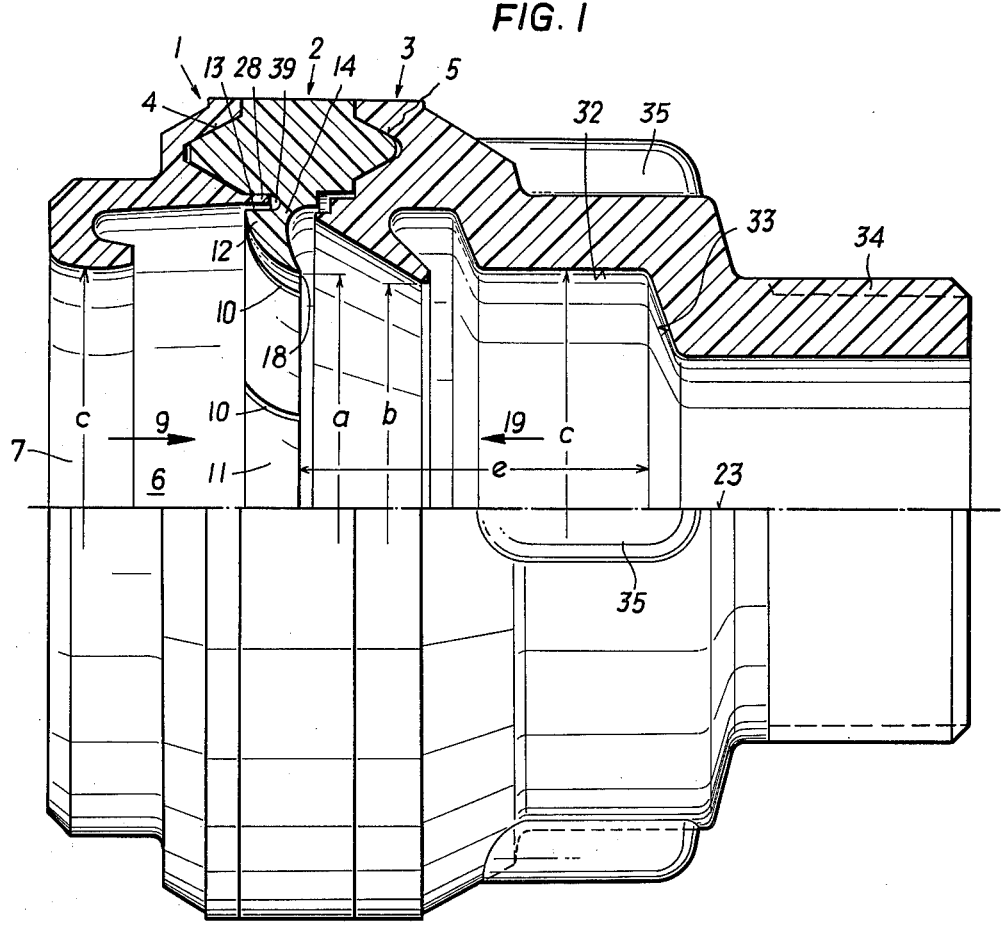

Referring to FIG. 1, the fitting piece is composed of three elements, defined as 1, 2 and 3, respectively. These elements are made separately by die-casting and combined together by a friction welding process. The welded surfaces are shown at 4 and 5. Welding is accomplished in a simple manner by pressing and contra-rotating the elements against one another. The elements are formed of a thermoplastic material, particularly of a polyacetal resin.

The fitting piece has a tube-receiving opening 6 whose entrance end is indicated at 7. Behind the receiving opening 6 there is provided an annular rib 8. The internal diameter of the free edge of said rib in a state of looseness is $a$. Diameter $a$ is smaller than the nominal diameter of the tube, the difference may be, e.g., 0.8 percent. By a tube inserted into the opening 6 the annular rib is deformed in the direction of the arrow 9. The rib is divided into eight segments 11 by eight radial incisions 10, so that the deformation is diminished and insertion is facilitated. From the side directed to the outer end 7 of the basis 12 of the rib 8 is narrowed by an annular groove 39 axially extending through about half the base 12. So there remains only an annular zone 14 which connects the rib with the fitting element 2.

Since machining a narrow slot offers considerable difficulties, element 1 is provided with an annular extension 28 projecting into the annular groove 39 provided in the element 2. Within said groove 39 receiving said extension 28 there remains a clearance indicated at 13. The clearance 13 can be diminished until zero.

When the fitting piece is inserted, the free edge 15 of the rib 8 shall pivot according to an arc 16 whose center is identified at 17. The clearance 13 shall be widened, so that the plurality of incisions 10 as well as the weakened base 12 facilitate inserting a tube into the opening 6. The extremely sharp tip 18 of the edge 15 fits firmly onto the wall of the inserted tube (see FIG. 2).

When an extraction force is applied on the tube, the rib 8 pivots following the direction of the arrow 19. The clearance 13 closes and the base 12 of the rib has full abutment on the element 2 so that the edge 15 pivots along an arc 20 having its center at 21. The rib 8 diminishes the internal diameter $a$ of its annular tip 18 which joins more closely against the wall of the tube. That means the tube is secured against being extracted.

The center line 22 of the cross-section of the rib 8 is inclined to the axis 23 of the fitting by an angle $\beta$ measuring from 60° to 80°, preferably about 70°. Consequently, any pivoting movement of the rib 8 in direction of the arrow 9 increases its internal diameter $a$, movement in the opposite direction decreases it. The inner surface 24 of the rib 8 is inclined to the fitting axis 23 by an angle $\alpha$ of about 80°; the front surface within the region of the end tip 18, by an angle $\delta$ of about 20°. The radial length 26 of the cross-section of the rib equals about 1½ to 3 times its width 27.

A sealing lip 25 is provided behind the rib 8 (seen in inserting direction). The internal diameter $b$ of said lip is smaller than the diameter 8 of the rib tip, the difference being about 1.5 percent. Hence the end surface 29 of the sealing lip 25 engages tightly the wall of the inserted tube. The length 30 of said lip equals about 3 to 10 times (preferably 4 to 5 times) its medium width 31. The end surface being cylindrically shaped contacts resiliently the tube. There is no danger of damaging the outer surface of a tube inserted thereinto so that the sealing quality remains in durable effectiveness.

The tube-receiving opening 6 is narrowed at the entrance end 7 and at the inner end 32. The narrowed diameter $c$ corresponds to the nominal diameter of the tube plus an additional small clearance. Taking into account the tolerance, the diameter $c$ surpasses the nominal diameter of the tube by 1.6 mm. Thus the inserted tube is held in its axial direction at the points 7 and 32. A bending stress cannot take effect upon the annular rib 8 or the sealing lip 25.

The shoulder 33 serves as a stop for a tube being inserted into the opening 6. The distance $e$ between said shoulder and the edge of the rib 8 should not turn out under a predetermined value. The rib 8 presses itself into the tube wall; behind rib 8, said tube regains its original diameter. Expanding of the tube to its original size after the annular rib reinforces the resistance against extraction from the fitting piece. It has been proved that the distance between the shoulder 33 and the edge 15 of the rib 8 should be no shorter than 0.2 D + 7.2 mm, wherein D means the nominal diameter of the tube and 7.2 mm is an empirical value.

The example shown in the drawings represents a fitting piece — having on one side a screw thread 34 for connecting the fitting piece to an armature. According to another embodiment the fitting piece serves to interconnect two tubes. In this case a portion on the right hand of the shoulder face 33 is to be configurated symmetrically to the left hand portion of the fitting piece and two shoulder faces 33 are positioned on an inwards protruding annular projection. Axially extending ribs 35 serve as engaging surfaces for an assembly tool.

Figure 3:
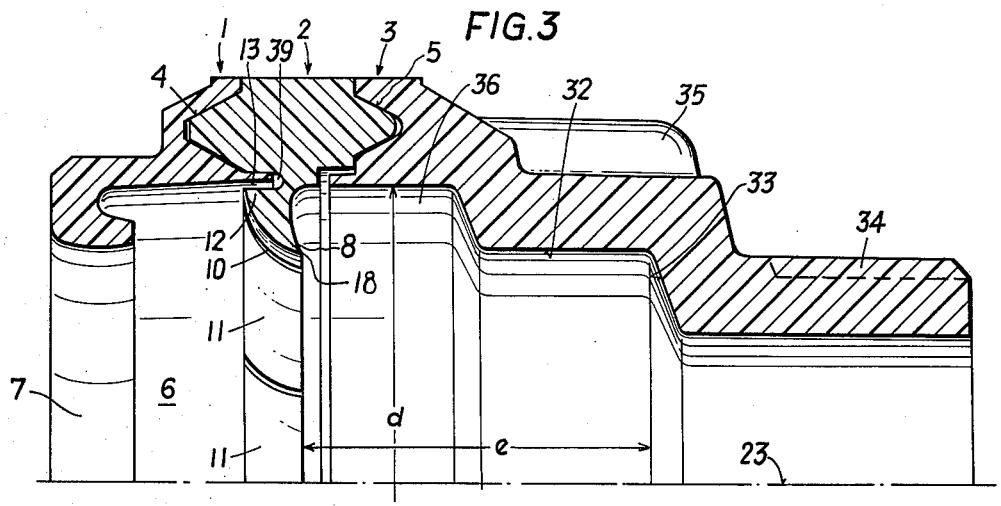
FIG. 3 shows a modified embodiment of the invention.
Figure 2:
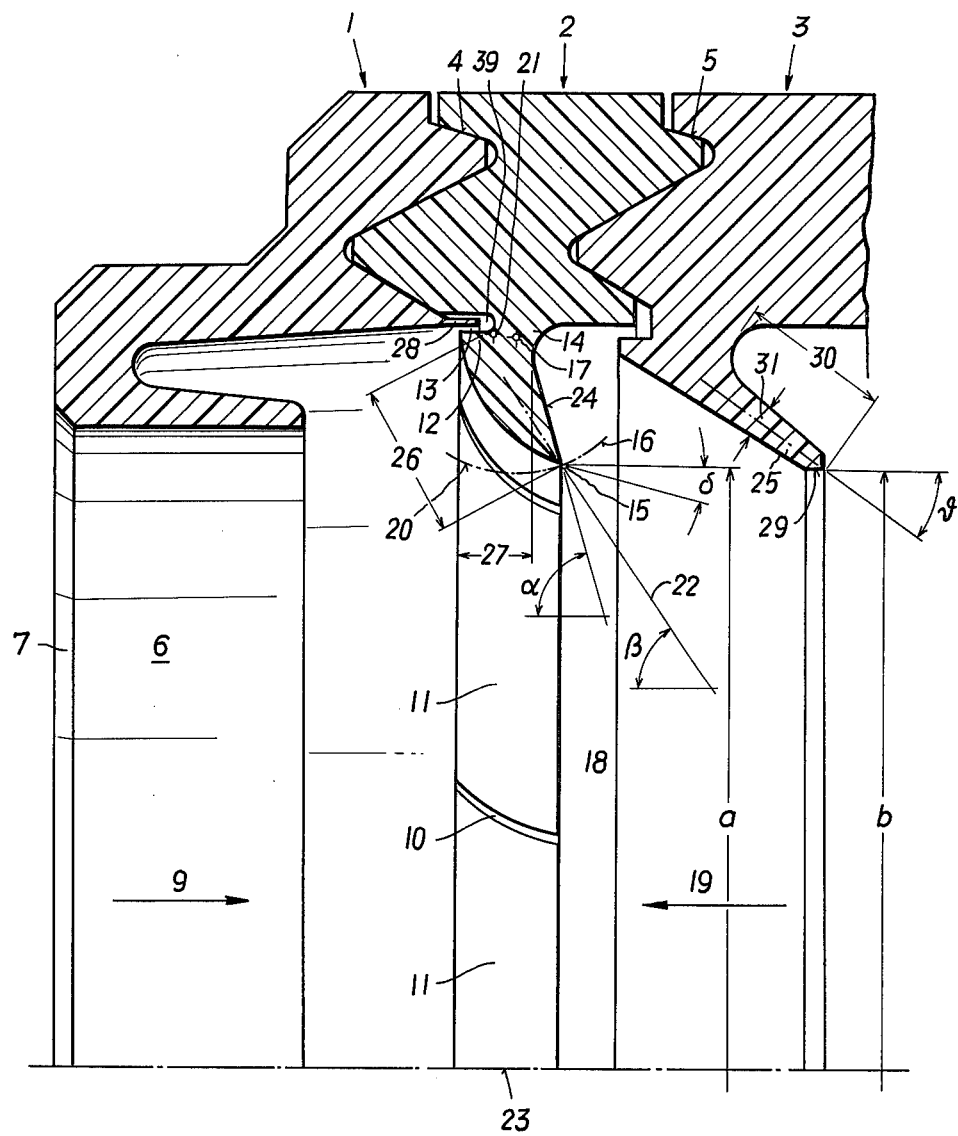

The embodiment according to FIG. 3 differs from the fitting piece shown in FIGS. 1 and 2 only by an O-ring provided instead of the sealing lip 25. A lodging space 36 for said ring is provided within the opening 6 by an enlarged zone located behind the annular rib 8, the enlarged diameter $d$ being greater than the inner diameter $a$ of the annular rib.

Figure 4:
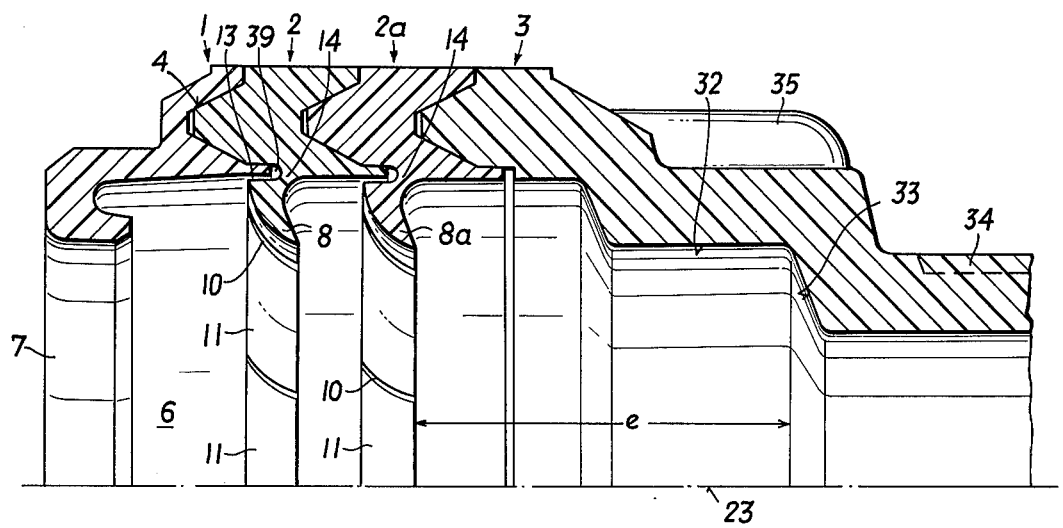
FIGS. 4 and 5 are fittings having a plurality of ribs.

FIG. 4 differs from FIG. 3 only by an additional annular rib 8a. A system of two annular ribs insures a better attachment. The additional rib 8a is integrally formed on an element 2a, so that the whole of the fitting piece consists in four elements 1, 2, 2a and 3, which are connected together by a friction welding process. In this case, the aforementioned distance $e$ is to be measured from the rear annular rib 8a.

Figure 5:
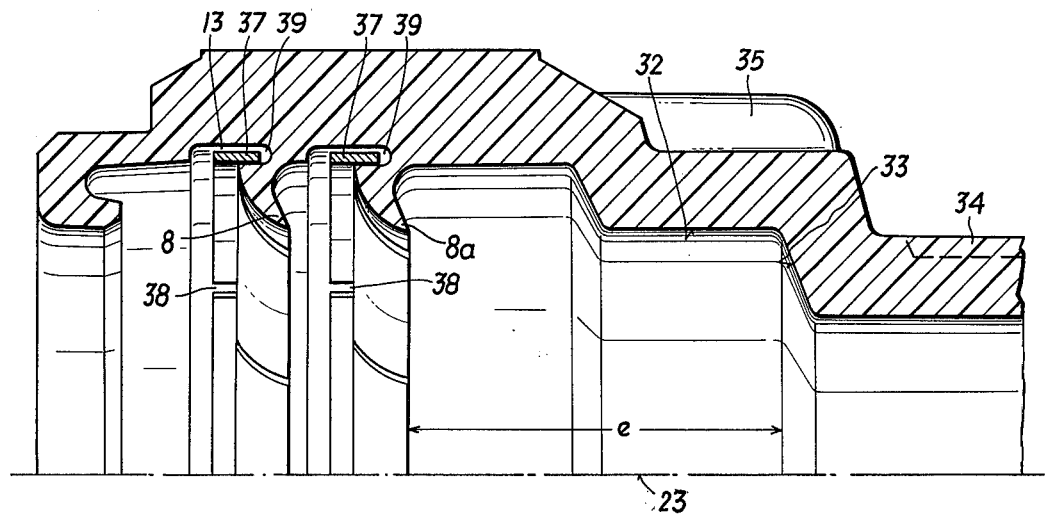

FIG. 5 differs from the embodiment according to FIGS. 1 through 4 by a filling ring 37 inserted into the annular groove 39. Said ring 37 diminishes the clearance 13 in a similar manner as the axial extension 28. A slot 38 enables the ring 37 to be inserted into the groove 39. Such an assembly is to be preferred when the fitting piece is manufactured integrally from one piece and not composed of separate elements combined afterwards by welding.

In a fitting piece according to FIGS. 1 through 5, the annular rib 8 is deformed in the direction of the arrow 19 when an extracting force is applied on an inserted tube. That diminishes the inner diameter $a$ of the annular rib; and the narrower the diameter, the greater the force retaining the tube in the opening. On the other hand, it is possible to extract the tube without destruction by means of a thin metal sheet. One bends the metal sheet to a diameter which corresponds to the diameter of the tube and inserts the same between the tube and the annular rib after the tube has been unloaded from tension forces. In this way, the edges 15 of the rib are lifted from the tube in the direction of the arrow 9 so that the tube may be extracted in the opposite direction 19. For that reason it is useful to provide an oversize for the diameter of the entrance end 7 in comparison with the nominal diameter of the tube to be inserted and preferably in comparison with the diameter at the inner end 32.

Figure 6:
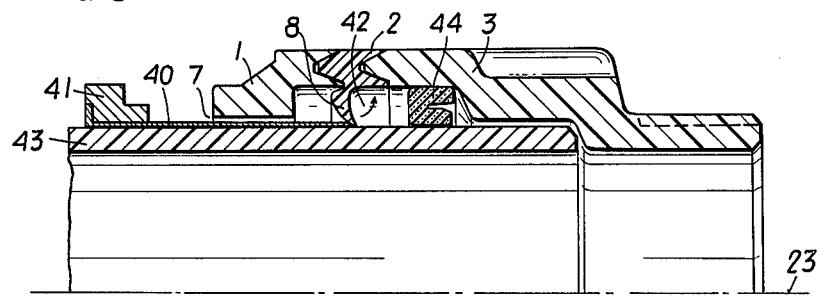
FIG. 6 illustrates how to disconnect the tube from the fitting piece.

This is illustrated in FIG. 6. One inserts through the entrance end 7 two semi-cylindrical thin metal sheets 40 having a grip portion 41. By these sheets the rib 8 is deformed following the arrow 42 and lifted from the tube 43. The rib is cut out of action and the tube may be extracted. An annular sealing lip is identified in FIG. 6 at 44.

Figure 7:
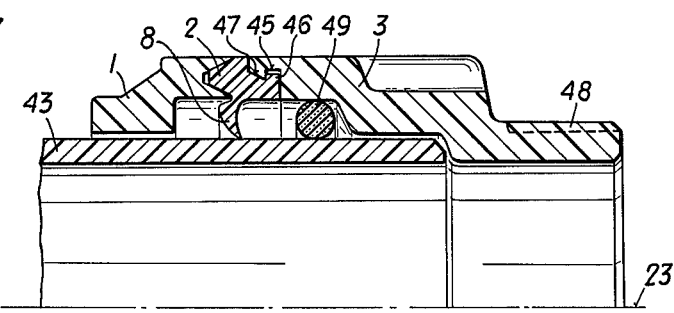
FIGS. 7 and 8 are modifications.

FIG. 7 shows an example where the elements 1 and 2 are interconnected by friction welding as in the embodiments of FIGS. 1 through 5. Element 3 is not welded onto element 2. An annular groove 45 which opens towards the interior of the fitting piece is provided on the element 3 to receive a rim 46 projecting from element 2. A tapered socket 47 provided on element 3 allows axial inserting of the element ½ whereby the rim 46 is caught in the groove 45. Hence the element 3 is rotatably connected to the element ½ and at the same time firmly coupled against axial forces. Thus it is possible to equip the element 3 with a screw thread 48 and to thread it into any fixed armature without rotating the element ½. The advantage is that the annular rib 8 is not rotated with relation to the tube 43 and that the sharp edges 18 of the rib are prevented from damaging the tube. Notwithstanding, sealing is insured by the sealing ring 49 which in the example is formed as an O-ring.

Figure 8:
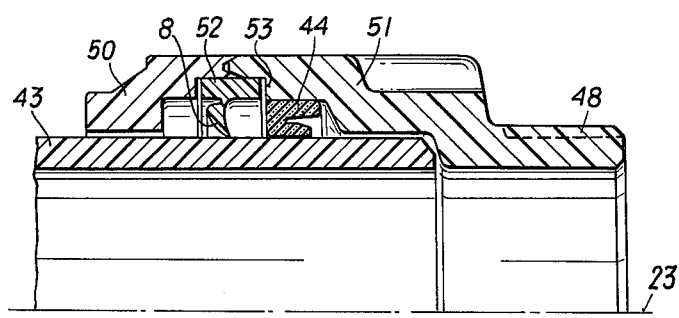

The fitting piece of FIG. 8 is composed of two elements 50 and 51 interconnected by friction welding so that the final result is a one-piece device. The annular rib 8 forms part of a ring element 52 separately inserted into an annular groove 53 provided in the combined element 50/51. Said ring element 52 may be inserted prior to the welding process combining the elements 50 and 51. The inserted ring 52 supporting the annular rib 8 is freely rotatable within said groove 53 but in axial direction it is either non movable or movable within a limited distance only. Again, said rib 8 is not forced to rotate with relation to the tube 43 when the fitting piece is screwed on a fixed armature.

What we claim is:

1. A fitting piece for connecting rigid or flexible tubes which are made of plastic, said fitting piece including a body having an opening to receive therein an end of the tube and being provided with at least one radially inwardly protruding annular rib having a base portion and a sharp tip, said rib being divided into segments by radial slots and tapering in cross-section from its base toward its tip, said tip being adapted to contact the surface of the tube when the tube is inserted into said opening, the center line of the cross-section of the rib passing through said tip and the center point of the rib base forming an acute angle with the axis longitudinal of said opening, the vertex of said angle pointing to the interior of said opening, said rib and the portion of the body of the fitting surrounding said rib being made of one piece and the rib base adjoining said body being provided on the side facing toward said opening with an axially extending annular slot which extends approximately through half the cross-sectional width of the rib base.

2. A fitting as in claim 1 including a ring engaging said annular slot in the rib base.

3. A fitting as in claim 1 which is formed of several separate annular elements made of thermoplastic material connected together by friction welding, at least one of said elements being provided with an axially extending annular extension which engages said annular slot in the rib base of an annular rib formed on the adjacent element.

4. A fitting as in claim 1 made from plastic having a coefficient of elasticity from 20000 to 40000 kgf per cm$^2$.

5. A fitting as in claim 4 wherein the coefficient of elasticity is from 33000 to 36000 kgf per cm$^2$.

6. A fitting as in claim 1 made from polyacetal resin.

7. A fitting as in claim 1 wherein said center line of said annular rib forms an angle of 60° – 80° with the axis of said opening, wherein the side of said annular rib facing inwardly to the tube-receiving opening forms an angle of about 80° with the axis of said opening and wherein the front side of the annular rib at the tip forms an angle of about 20° with the axis of said opening.

8. A fitting as in claim 1 wherein the diameter of the tube-receiving opening is set off before and behind the annular rib, which diameter corresponds to the diameter of the tube plus a slight play.

9. A fitting as in claim 1 including an internal shoulder limiting the insertion depth of the tube into the fitting, the distance between said shoulder and the last annular rib seen in the direction of insertion being equal to at least 0.2 D + 7.2 mm, wherein D is the nominal diameter of the tube intended to be inserted into the fitting.

* * * * *